Dec. 30, 1958 J. H. DEMPSEY 2,866,889
WELDING METHOD AND MEANS FOR HOLDING A BACK-UP
STRIP IN POSITION FOR WELDING
Filed April 9, 1956
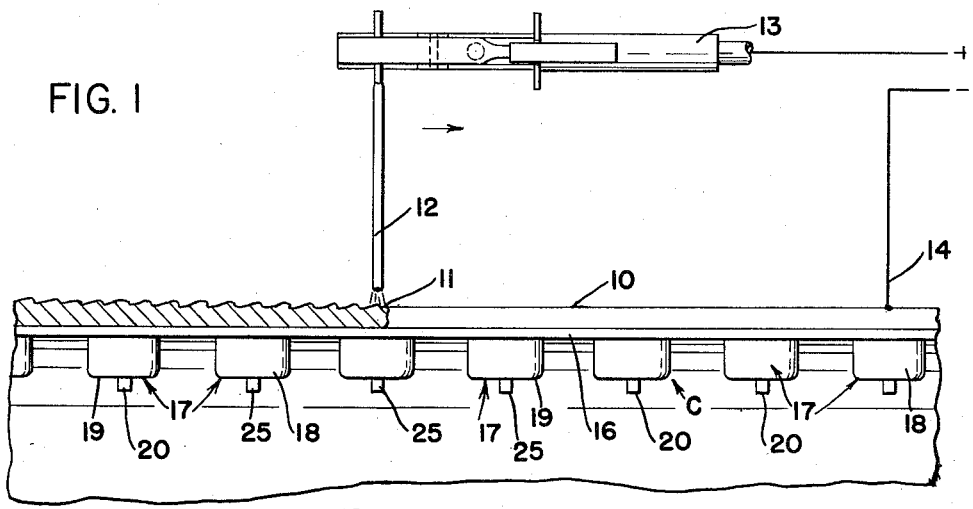
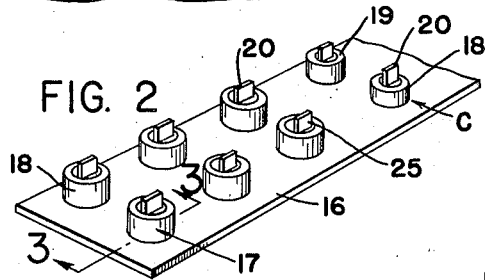
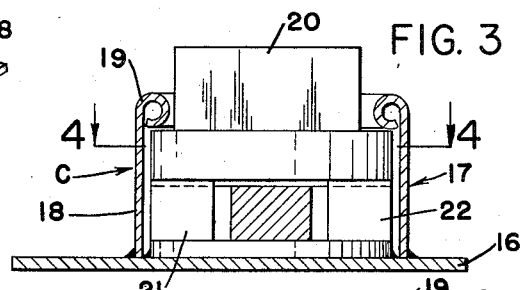
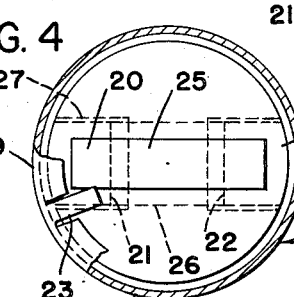
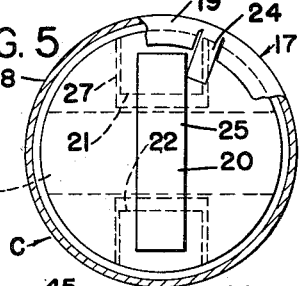
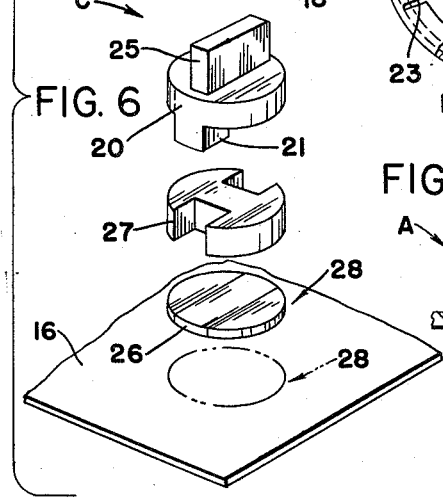
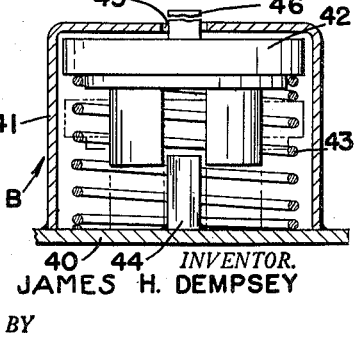
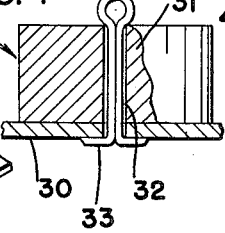
INVENTOR.
JAMES H. DEMPSEY
BY
Fay & Fay
ATTORNEYS

United States Patent Office 2,866,889
Patented Dec. 30, 1958

2,866,889

WELDING METHOD AND MEANS FOR HOLDING A BACKUP STRIP IN POSITION FOR WELDING

James Hellis Dempsey, Lakewood, Ohio

Application April 9, 1956, Serial No. 577,000

2 Claims. (Cl. 219—160)

This invention, relating as indicated to a welding method and a means for holding a back-up strip in position for welding, is particularly directed to a method of welding employing a reuseable back-up strip of a nonmagnetic material for electric arc welded butt joints, either in vertical, horizontal or circumferential welding of seams, but particularly in places where the weldment has one side which is enclosed and not readily accessible.

The invention is further directed to the construction of a back-up strip employing releasable permanent magnets of holding type which have a high coercive force material to insure adherence to magnetic materials.

The invention also relates to the construction of the releasable magnets.

In general, it may be said that there is need for a reuseable non-magnetic back-up strip for electric arc welding, particularly in pressure vessel fabrication and in such other uses as aircraft companies, sheet metal shops, ship builders and automotive companies, as well as miscellaneous operations employing welding, where one side of the weldment is inaccessible. Many of the butt welds employed have rough edges, and it is difficult to employ jigs and fixtures to hold the back-up strip in position.

This invention is directed to a method of welding which will hold a back-up strip in position in these operations in a simple manner by the use of releasable permanent magnets of high coercive force attached to a non-magnetic back-up strip, said strip being preferably of thin soft copper material, though equivalent materials may be used.

This invention would be particularly used in vertical, horizontal or circumferential seams, particularly long seams on all light and heavy gauge metals. It also may be used on non-magnetic alloys where the gauge of the metal is not beyond the range of the coercive force of the permanent magnets for the weldment of these non-magnetic materials. Blocks or strips of magnetizable material, such as mild steel, are placed adjacent to the butt joint on both sides of the joint and allowing the magnetic strip to attract from one side of the joint through the magnetizable material.

This invention would particularly be useful in connection with automatic and semi-automatic welding equipment where this equipment could be employed even though the butt joint of the seams were jagged and rough where hand welding might be used.

The invention, further, would be an improvement in the quality of the weld while employing men of less skill.

In connection with butt joint seams of thin gauge material, this invention also serves to hold the butt joint together, obviating the need for special fixtures to hold the butt joint together while welding.

An object of this invention is to produce a new and improved method of butt joint welding, particularly long seams, by placing a non-magnetic back-up strip behind the weld and holding the back-up strip in position by means of releasable permanent magnets of high coercive force material to hold the back-up strip to the weldment or through the weldment to other magnetizable material.

A further object of this invention is to produce a new and improved back-up strip for use in connection with welding to produce a fine weldment and to secure the butt joint of the weld together by securing magnets to the back-up strip.

A further object of this invention is to produce a new and improved permanent magnet employing some moveable keeper structure to short circuit the flux lines of the permanent magnet.

To the accomplishment of the foregoing and related ends, said invention, then, consists of the means hereinafter fully described and particularly pointed out in the claims; the following description setting forth in detail one approved method of carrying out the invention, such disclosed method, however, constituting but one of the various ways in which the principles of the invention may be used.

In the drawings:

Figure 1 is a cross-sectional view of a back-up strip beneath a butt joint weldment, showing an arc welding apparatus in position, forming the weld;

Figure 2 is a reduced cut-away view of the back-up strip showing the permanent magnets in position on the strip;

Fig. 3 is a cross-sectional view along the line 3—3 of Fig. 2, showing the permanent magnet attached to the strip;

Fig. 4 is a view along the line 4—4 of Fig. 3, showing the keeper short circuiting the pole pieces of the magnet;

Fig. 5 is a further view of the magnet rotated through 90°, showing the pole pieces in operating position;

Fig. 6 is an exploded diagrammatic view of the components of my preferred magnet structure;

Fig. 7 is a cross-sectional view through an alternate modification of the magnet structure; and Fig. 8 is a further modification of the magnet.

In the drawings, 10 shows a weldment in a horizontal seam; 11 shows the actual area of the weld. 12 is the electrode, and 13 the welding apparatus. Electrical connections are shown at 14. The back-up strip is shown in position at 16, and one of the releasable permanent magnets is shown at 17. The back-up strip would be of pliable, soft copper material, possibly a 28 ounce strip of annealed copper, though other materials which would not be wet by or adhere to the weldment at the temperature of the weld may be used. It is desired to form a weld which will not have a heavy beaded structure on the rear with large openings in the weld necessitating a number of passes on both sides of the weldment in order to insure a tight weld. Many of the welds are jagged and have rough edges, and weld material passes through the seam or butt joint.

Fig. 2 shows a cut-a-way reduced view of the back-up strip, and the back-up strip is shown at 16, and the magnets therefor are shown at 17. This strip would be perhaps 48" in length, though various lengths may be used. The strip would be possibly 2" in width which would be necessary to adequately cover the seam. Magnets would be placed along each side of the strip, spaced from the outside edges, and may be of any of the types as shown in either Figs. 3, 4, 5 or 6, or the type shown in Figs. 7 and 8. These types of magnet structures are respectively designated as C, A and B. The preferred type of magnet, type C, is particularly adapted for use in enclosed conditions where it would be very difficult to pull off the back-up strip after completing the weld. It is understood, of course, that the back-up strip would necessarily be held tightly against the welded area, and the magnet materials of very high coercive force at closely spaced intervals along the strip would be exceedingly difficult to pull away from the weldment. Accordingly, these magnets are adapted to be short circuited by means of a keeper of a highly permeable soft iron which would be in the form of a disc welded to a non-magnetic material, such as copper, and the magnet could be rotated with respect to the soft iron keeper to be in position in front of the pole pieces to short circuit the flux lines of the magnet. An outer housing member is shown at 18 having a rolled top edge 19 and a cast permanent magnet structure as shown at 20, having two pole pieces 21 and 22. Stop elements on the housing member 18 are shown at 23 and 24. An elongated handle for the magnet is shown at 25.

Fig. 4 shows a view along the line 4—4 of Fig. 3, in which the magnet handle 25 has been moved around so that the pole pieces 21 and 22 substantially are in register with the highly permeable soft iron 26, which acts as a keeper to short circuit the magnetic flux lines.

Fig. 5 is a view along the line 4—4 of Fig. 3, showing the handle in the straight across position, and in this case it is the operative position in contact with the stop member 24, so that the flux lines do not pass through the keeper, and it may be attracted to the magnetic material of the weldment.

Fig. 6 shows an exploded view of the parts, showing the housing member 18, the cast permanent magnet 20 having a handle element 25 and pole pieces 21 and 22. 27 is the filler washer adapted to surround the pole pieces to provide a solid turning base. It may be a solid copper, and in one particular instance would be about 1" in diameter and ¼" thick. The cutouts may be punched from the disc circular edges opposite to one another. 28 shows the magnetic disconnect disc or keeper element, and this is a small flat circular disc about 1" in diameter in one particular model, and is constructed of metal segments. The copper strips on the side are brazed to the highly permeable soft iron, and this acts as a keeper and will short circuit the flux lines of the magnet. The copper disc is brazed to the back-up strip as is the housing element 18.

As alternate modifications for the back-up strip, one type is shown in Fig. 7, where a copper strip is shown at 30, forming the back-up strip, and a magnetic material of high coercive force is shown at 31, having an aperture or hole therein 32, and this magnet would be attached to the copper strip by means of a cotter pin 33 of copper or other non-magnetic material. This particular example, shown in Fig. 7, might be used in connection with automatic welding of large diameter pressure vessels where there would be easy access for the welding operator to manually pull the strip away from the underside of the shell seam without difficulty. In another modification, Fig. 8, the copper strip is shown at 40, a cover housing at 41 and an Alnico magnet at 42. Between the copper strip and the magnet would be a spring, possibly of non-magnetic stainless steel, shown at 43, and a guide bar 44 which would be brazed to the copper strip and would be adapted to fit on the underside of the magnet. On the upper side of the cover housing would be an opening 45 through which the stem or holder for the magnet 42 would project, the stem is shown at 46. This particular type of back-up strip and magnet structure is particularly useful in high production applications where flat butt joints are close to the edge of the finished metal. The magnets are adapted to hold in position only when the top button is pushed down. This allows for better adjustment of the back-up strip under the joint to be welded. This magnet structure and back-up strip are adapted to be released by sliding the entire strip off the edge of the plate.

This invention, then, relates to the method of welding the aforementioned, employing the back-up strip and the magnet structures, particularly described herein.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. A permanent magnet structure particularly adapted for attachment to back-up weld strips, comprising a housing member having openings at both ends thereof, a permanent magnet of high coercive strength enclosed therein, said housing member being of non-magnetic material, said permanent magnet having a pair of pole pieces oppositely disposed therein, a circular keeper element adjacent said pole pieces, said keeper element having a central strip across said circular disc of highly permeable soft iron, with a non-magnetic material comprising the balance of said strip, an end member for said magnet structure to which the housing and keeper disc are attached, a handle for said permanent magnet and stop elements on said housing whereby the permanent magnet may be positioned over said keeper element and oppositely disposed to said keeper element, as desired.

2. A permanent magnet structure adapted to be secured to back-up weld strips, comprising a circular housing member of non-magnetic material secured to said strip, said housing element having an open bottom and a top opening, stop members on said top end, a permanent magnet structure having a pair of pole pieces oppositely disposed to one another, and a handle structure adapted to extend through said top opening, a non-magnetic filler disc surrounding said pole pieces, a keeper disc attached to said back-up weld strip, comprising a diametrically disposed highly permeable soft iron keeper and a non-magnetic material on either side thereof forming said disc, the width of said soft iron strip being approximately that of the pole pieces of said magnet, a handle structure for said permanent magnet whereby the handle may be rotated to position the magnet over the keeper structure to short circuit the flux lines of the magnet, and may be alternately positioned perpendicular thereto against a stop on said housing so that the flux lines are not short circuited by the keeper whereby the magnet structure may be easily released.

References Cited in the file of this patent

UNITED STATES PATENTS

| | | |
|---|---|---|
| 1,449,369 | Anderson | Mar. 27, 1923 |
| 2,205,002 | Tripp | June 18, 1940 |
| 2,280,437 | Levesque | Apr. 21, 1942 |
| 2,492,238 | Roof | Dec. 27, 1949 |
| 2,584,021 | Jackson | Jan. 29, 1952 |
| 2,595,833 | Flaherty | May 6, 1952 |

FOREIGN PATENTS

| | | |
|---|---|---|
| 527,211 | Belgium | Sept. 13, 1954 |